United States Patent
Leitloff et al.

(10) Patent No.: US 6,392,857 B1
(45) Date of Patent: May 21, 2002

(54) DEVICE AND PROCESS FOR PROTECTING A LINE OF A NETWORK OF ELECTRICITY SUPPLY LINES

(75) Inventors: Volker Leitloff, Montrouge; Michael Nassaeur, Aachen; Patrick Bastard, Gif sur Yvette, all of (FR)

(73) Assignee: Electricite de France-Service National, Paris (FR)

( * ) Notice: Subject to any disclaimer, the term of this patent is extended or adjusted under 35 U.S.C. 154(b) by 0 days.

(21) Appl. No.: 09/534,564

(22) Filed: Mar. 27, 2000

(30) Foreign Application Priority Data

Mar. 30, 1999 (FR) .............................. 99 03972

(51) Int. Cl.$^7$ .............................................. H02H 3/38
(52) U.S. Cl. ......................................................... 361/80
(58) Field of Search ........................................... 361/80

(56) References Cited

U.S. PATENT DOCUMENTS

| | | | | |
|---|---|---|---|---|
| 4,737,879 A | * | 4/1988 | Andersson et al. | ............ 361/80 |
| 5,742,513 A | * | 4/1998 | Bouhenguel et al. | ........ 364/492 |
| 6,028,754 A | * | 2/2000 | Guzman-Casillas et al. | .. 361/89 |

FOREIGN PATENT DOCUMENTS

EP             0 203 472          12/1986

\* cited by examiner

*Primary Examiner*—Adolf Deneke Berhane
*Assistant Examiner*—Pia Tibbits
(74) *Attorney, Agent, or Firm*—Sughrue Mion, PLLC

(57) ABSTRACT

This device for protecting a line (10, 12) of a network of supply lines comprises two protective relays (18, 20; 22, 24) furnished with means for detecting faults and a circuit breaker adapted so as to disconnect the line from the network of lines in the presence of a fault, each relay being adapted so as to monitor a first zone ($Z_1$) of the line corresponding to a zone of certain detection of a fault (10, 12) and at least one second zone ($Z_2$) juxtaposed with the first zone and corresponding to a zone of uncertain detection of a fault. At least one of the relays comprises means for detecting the opening of the circuit breaker associated with the other relay in response to a detection, by the latter, of a fault in the first zone in such a way as to cause the opening of the circuit breaker associated with the said at least one relay (18, 20; 22, 24). The means for detecting the opening of the circuit breaker comprise means for calculating a characteristic representative of the variation of a measurement value of the impedance of the line and means for comparing this characteristic with a threshold value.

8 Claims, 2 Drawing Sheets

DEVICE AND PROCESS FOR PROTECTING A LINE OF A NETWORK OF ELECTRICITY SUPPLY LINES

The present invention relates to a device for protecting a line of a network of electricity supply lines, and to a protection process implemented by means of such a device.

In such a network, the occurrence of a fault could cause disturbances which might affect the operation of the network and the quality of the supply provided to subscribers.

For example, an improperly eliminated fault on a very high voltage network, that is to say a network carrying a voltage of 150 kilovolts, 225 kilovolts or 400 kilovolts could result in a considerable part of the geographical zone covered by the network being deprived of supply. Likewise, faults on a high voltage network, namely a network carrying voltages of the order of 42 kilovolts, 63 kilovolts or 90 kilovolts give rise to voltage dips or short, or possibly long cuts in the supply provided to subscribers.

With the aim of limiting the effects of a fault, the networks are generally fitted with protective relays each arranged at one end of a line of the network. These relays are equipped with means for detecting faults and are each linked to a circuit breaker adapted for disconnecting the line from the network of lines as soon as a fault occurs on the line.

Such protective relays must exhibit extreme reliability, that is to say an absence of operating fault and an absence of inadvertent operation.

Indeed, a malfunction of a protective relay is constraining, for the network, if it leads to late and non-selective elimination of faults, that is to say if it causes the opening of a circuit breaker which is not necessary for the elimination of a fault.

Indeed, high voltage networks and very high voltage networks are generally intended to carry high energy levels, the load currents possibly reaching several thousand amperes.

After a relay opens, there is an instantaneous diversion of load onto the portions of the network remaining in service.

It is therefore necessary to trigger only the protective elements which are strictly necessary for the elimination of a fault, so as not to be confronted with power levels which are insupportable on other parts of the network, and consequently with cascade triggerings.

The selectivity of elimination of faults is a major constraint for protective relays, in so far as it considerably increases the complexity of the relays.

To achieve the objectives mentioned above, various types of protective devices are nowadays fitted to electricity distribution networks.

One of these types of protective device, which are universally used by the operators of distribution networks, uses the technique of so-called "distance protection".

According to this technique, each protective relay is adapted for zonewise monitoring of the network, several relays possibly being tripped by one and the same fault.

More particularly, according to this technique, each line is fitted with a pair of relays each arranged at one end of the line, so that each relay is adapted for monitoring a first zone of the network extending over a portion of the line and corresponding to a zone of certain detection of a fault on this zone and at least one second zone of the network juxtaposed with the first zone and overlapping a portion of an adjacent supply line, the second zone encompassing a portion of the line in which the other protective relay is situated and corresponding to a zone of uncertain detection of a fault on this line.

Thus, for example, the first zone covers 80% of the length of the line, and the second zone covers a portion of the network extending between 80% and 120% of the length of the line, a third zone possibly being provided onwards of a portion of the network extending from 120% of the length of the line.

In this type of protective device, a fault detected in the first zone causes instantaneous opening of the circuit breaker associated with the corresponding relay, whilst a fault detected within the other zones gives rise to a delay in the opening of the circuit breaker of this relay.

This is because the locating of the site of the fault is carried out with a measurement error which may be as much as 20%.

Thus, when a relay detects a fault in the first zone, it locates the fault in a certain manner within the supply line corresponding thereto and causes instantaneous opening of the circuit breaker.

On the other hand, a fault detected in the second zone may either be situated on the supply line to which the relay belongs, or on the adjacent supply line.

Consequently, in this case, the relay performs a time-out so as to be able to determine whether the protective relay fitted to the adjacent supply line has detected this fault in the first zone and has thereupon caused the opening of the circuit breaker with which it is fitted.

On the other hand, if the fault, detected in the second zone, is situated on the same supply line, the other relay, that is to say the relay arranged at the opposite end of the line, has necessarily detected the presence of this fault in the first zone and has caused the opening of the circuit breaker with which it is fitted.

In this case, it is however necessary to cause the two circuit breakers to open so as to isolate the incriminated portion of the network and thus avoid retention of the supply, which might create risks for the environment and for personnel (fires, electrocutions, etc).

Certain types of distance protection devices are equipped with linking means ensuring transmission of information between the relays of each pair so as to cause the opening of the circuit breaker of each relay in response to a detection, by this relay, of a fault in the second zone and to a detection, by the other relay, of a fault in the first zone.

This technique, although effective for isolating a portion of defective network, nevertheless requires that cabling and means for sending and receiving specific data be provided on the supply network, thereby considerably increasing the cost of such a protective device.

SUMMARY OF INVENTION

The purpose of the invention is to alleviate these drawbacks.

Its subject is therefore a device for protecting a line of a network of electricity supply lines, comprising at least two protective relays each arranged at one end of the line and each furnished with means for detecting faults and a circuit breaker associated with each relay and adapted for disconnecting the line from the network of lines in the presence of a fault detected on this line, each protective relay being adapted so as to monitor a first zone of the network extending over a portion of the line and corresponding to a zone of certain detection of a fault on the line and at least one second zone of the network, juxtaposed with the first zone and overlapping a portion of an adjacent supply line, the second zone encompassing a portion of the line in which another protective relay is situated and corresponding to a zone of uncertain detection of a fault on the said line, characterized in that at least one of the relays comprises means for detecting the opening of the circuit breaker associated with the other relay in response to a detection, by the latter, of a fault in the first zone so as to cause the opening of the circuit breaker associated with the said at least one relay, and in that the said means for detecting the opening of the said circuit breaker comprise means for calculating a characteristic representative of the variation of a measurement value of the impedance of the line and means for comparing the said characteristic with at least one threshold value for triggering the opening of the circuit breaker.

The protective device according to the invention can furthermore comprise one or more of the following characteristics, taken in isolation or according to all the technically possible combinations:

the calculating means consist of means for calculating the following ratio $R_1$:

$$R_1 = \frac{|Z_{Bclos} - Z_{Bopen}|}{|Z_{Bclos}|}$$

in which:

$Z_{Bclos}$ represents the value of the impedance measured by one of the relays, for a defective phase of the line, when the circuit breaker associated with the other relay is closed, and $Z_{Bopen}$ represents the value of the impedance measured by one of the relays, for a defective phase of the line, when the circuit breaker associated with the other relay is open;

the calculating means consist of means for calculating the following ratio $R_2$:

$$R_2 = \frac{|Z_{Bclos}| - |Z_{Bopen}|}{|Z_{Bclos}|}$$

in which:

$|Z_{Bclos}|$ represents the absolute value of the value of the impedance measured by one of the relays, for a defective phase of the line, when the circuit breaker associated with the other relay is closed; and $|Z_{Bopen}|$ represents the absolute value of the impedance measured by one of the relays, for a defective phase of the line, when the circuit breaker associated with the other relay is open;

the calculating means consist of means for calculating the impedance of the line.

The subject of the invention is also a process for protecting a line of a network of electricity supply lines, the line being equipped, at each end, with a protective relay comprising means for detecting faults and with a circuit breaker adapted so as to disconnect the line from the network of lines in the presence of a fault detected on the latter, the process comprising the steps consisting in, for one of the relays at least:

monitoring a first zone of the network extending over a portion of the line corresponding to a zone of certain detection of a fault on the said line and at least one second zone of the network, juxtaposed with the first zone and overlapping a portion of an adjacent line, in such a way as to detect a fault in the said zones, the second zone encompassing a portion of the said line in which the other relay is situated and corresponding to a zone of uncertain detection of a fault on the line; and opening the circuit breaker of the relay should a fault be detected in the first zone, characterized in that in the course of the step of monitoring the first and second zones of the network, the value of a characteristic representative of the variation of a measurement value of the impedance is calculated, the calculated value is compared with at least one threshold value for detecting the opening of the circuit breaker of the other relay, and the opening of the circuit breaker of the relay is triggered should the threshold value or values be exceeded.

According to a particular mode of realization of this process, with the said characteristic consisting of the impedance measured after the occurrence of the fault, the threshold values constitute, in a complex representation, a zone of detection of the opening of the circuit breaker of the said other relay, which zone is delimited, for a positive transit of power, by straight lines respectively corresponding to minimum and maximum values of the real and imaginary parts of the impedance measured in the absence of a fault, and to maximum and minimum arguments of the impedance measured when the distant circuit breaker is open, and by a straight line corresponding to a variation in the impedance measured as a function of the resistance of the fault.

According to another mode of realization of this process, with the said characteristic consisting of the measured impedance, the threshold values constitute, in a complex representation, a zone of detection of the opening of the circuit breaker of the said other relay, which zone is delimited, for a negative transit of power, by straight lines corresponding to minimum values of the real and imaginary parts of the impedance of the line measured after the occurrence of the fault and to minimum and maximum arguments of the variation in the measured impedance when the said distant circuit breaker is open, and by a straight line computed on the basis of the value of the impedance in the presence of a fault of zero resistance at the same spot and of the variation in the impedance measured as a function of the resistance of a fault of non-zero resistance.

BRIEF DESCRIPTION OF THE DRAWINGS

Other characteristics and advantages will emerge from the following description, given merely by way of example, and with reference to the appended drawings in which.

DETAILED DESCRIPTION OF THE INVENTION

Figure 1:
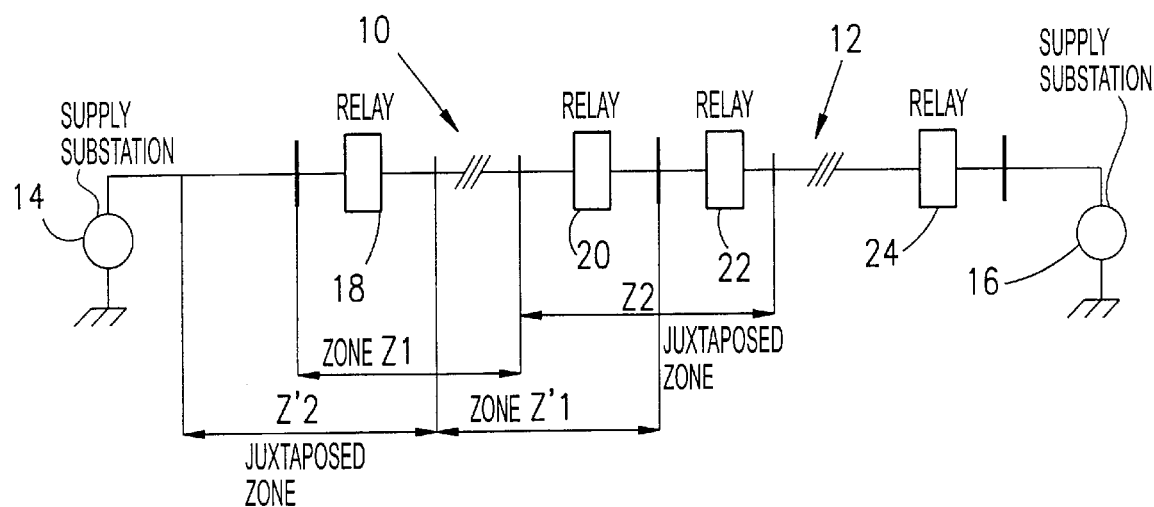
FIG. 1 is a diagrammatic view illustrating a network portion equipped with a protective device according to the invention.

Represented diagrammatically and in a one-wire manner in FIG. 1 is the structure of a three-phase electricity distribution network.

Although in this figure the network is represented in linear form, it is appreciated that, in fact, it has a meshed structure so as to allow the supplying of a geographical region with electricity.

The network consists of a succession of electricity supply lines, such as 10 and 12, each affording the transfer of electricity delivered by supply substations, such as 14 and 16, supplying the network.

For example, the network represented in this figure is a high voltage network, that is to say one capable of carrying a voltage of between 15 kV and 150 kV, approximately. However, the invention applies also to the protection of a very high voltage network, that is to say for voltages greater than 150 kV.

As is conventional, the network is equipped with a protective device affording detection of faults which could occur on the network, due for example to the earthing of one of the lines 10 and 12, and a disconnecting of the incriminated portion of network, from the remainder of the network.

The protective device comprises a set of protective relays 18, 20, 22 and 24, arranged in pairs, each pair of relays being fitted to a supply line 10 or 12.

In each pair, one of the relays is arranged at one of the ends of the supply line, the other relay being arranged at the other end of this line.

The relays 18, 20, 22 and 24 are relays which achieve protection of the "distance protection" type, that is to say they are adapted for zonewise monitoring of the network.

Thus, by considering the supply line designated by the numerical reference 10 in FIG. 1, one of the relays 18 monitors a first zone $Z_1$ of the network extending over a portion of the line 10, for example over a length representing 80% of the latter and a last zone $Z_2$ of the network, juxtaposed with the first zone $Z_1$ and overlapping a portion of the adjacent line 12, this second zone $Z_2$ covering, for example, a zone of the network extending between 80% and 120% of the length of the supply line 10.

Other monitoring zones may be envisaged.

However, in the subsequent description, each relay will be regarded as monitoring two zones.

It is appreciated, likewise, that the other relay 20 of the pair of relays monitors the network according to a first and a second zone $Z'_1$ and $Z'_2$ which are identical to the zones $Z_1$ and $Z_2$ mentioned above, and each corresponding to a portion of the network.

Each first zone $Z_1$ and $Z'_1$ constitutes a zone of certain detection of a fault on the line 10 to which the relays 18 and 20 belong, the second zones $Z_2$ and $Z'_2$ corresponding, for their part, to a zone of uncertain detection of a fault on this line.

Indeed, insofar as the first zone covers a part of the supply line on which the relay is arranged, the detecting of a fault, in this zone, corresponds to a locating of the fault on this supply line.

On the other hand, a detection in the second zone $Z_2$ or $Z'_2$ provides only a rather unreliable indication as to the location of the fault on one or other of two adjacent supply lines.

Consequently, the detecting of a fault in the first zone causes the opening of a circuit breaker associated with the relay.

However, and as will be described in detail subsequently, the protective device is equipped with means for detecting the opening of the circuit breaker of the relays of each pair, in response to a detection, by one of the relays, of a fault in the first zone, in such a way as to cause opening of the circuit breaker associated with the other relay.

Thus, in the case where one of the relays, such as 18, detects a fault in the second zone, the circuit breaker of this relay opens if this fault is detected in the first zone $Z_1$ by the other relay, such as 20, of the relevant pair.

Figure 2:
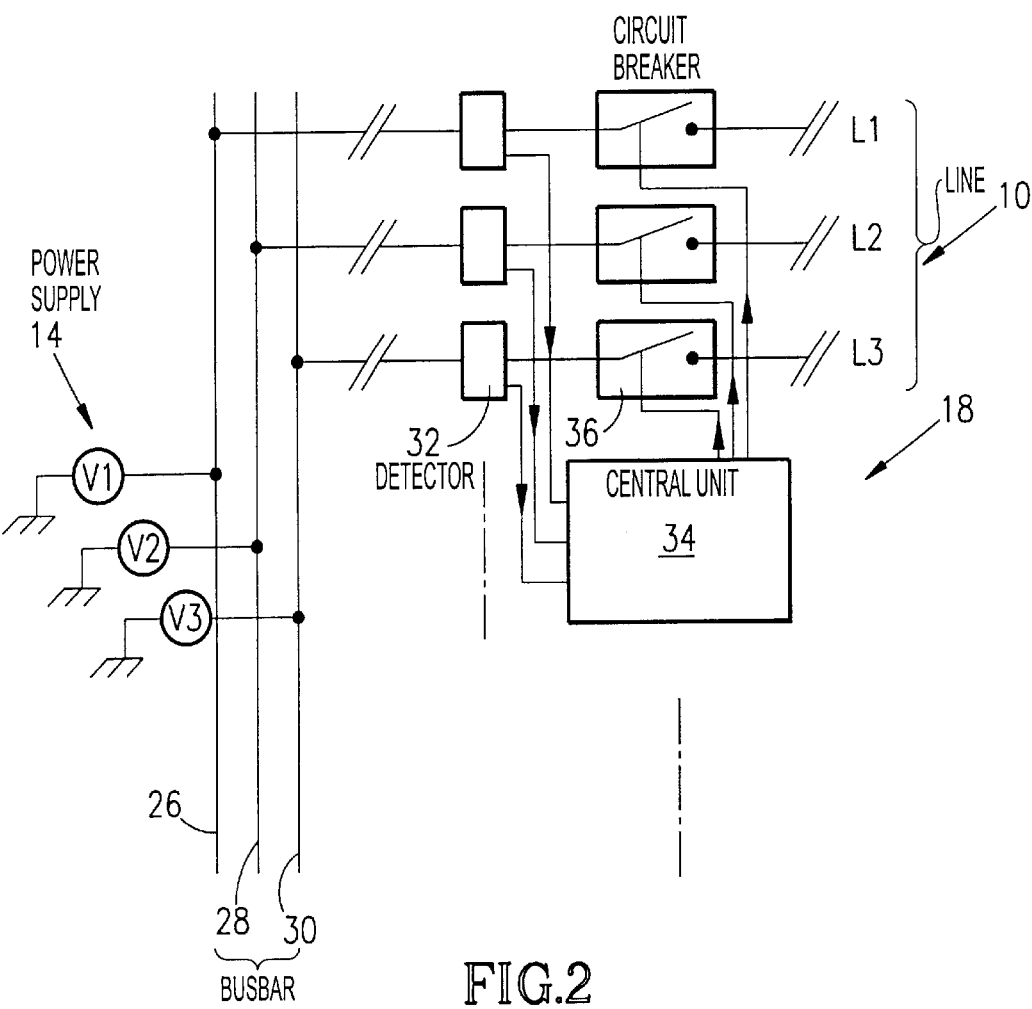
FIG. 2 is an enlarged view of a portion of the network of FIG. 1, showing the make-up of a protective device according to the invention.

The detailed description of a protective relay will now be given with reference to FIG. 2.

Represented in this figure in a three-wire manner is a part of the supply network of FIG. 1, this part being fitted with a relay such as 18.

One of the supply substations of the network 14 has been represented in the form of a three-phase power supply V1, V2 and V3 supplying a busbar 26, 28 and 30, to which are linked supply lines. In this figure only one line L1, L2, L3 has been represented.

As may be seen in this figure, the protective relay 18 is equipped with a set of detectors, such as 32, affording monitoring of the electrical quantities characteristic of the operation of the supply lines.

The detectors 32 of the line are linked to a processing unit 34 associated with the line, affording control of the operation of the circuit breaker, such as 36, fitted to each supply line L1, L2, L3, so as to disconnect them from the network as soon as a fault occurs.

For the detection of a fault on the supply line, the detectors 32 continuously monitor, under the control of the central unit 34, the main parameters of the network, such as the voltage, the current, or a combination of the voltage and the current.

The detectors 32 are detectors of conventional type, appropriate for the use envisaged. They will therefore not be described in detail subsequently. It should however be noted that they are capable, jointly with the processing unit 34, of carrying out zonewise monitoring of the network portion on which they are sited, that is to say of locating a fault detected either in the first zone, or in the second zone.

The processing unit 34 carries out a comparison between the monitored parameters and one or more predetermined threshold values for detecting a fault on the monitored portion of network so as to perform, should a fault be detected, one or more actions such as the carrying out of an additional measurement and causes, should a fault be detected in the first zone, the opening of the circuit breaker or circuit breakers 36 which is necessary to isolate the incriminated portion of network.

Moreover, the processing unit 34 of the relay 18 comprises software means for calculating a characteristic representative of the variation of the measured impedance of the line and for comparing the value of the calculated characteristic with one or more threshold values for detecting the opening of the circuit breaker or circuit breakers associated with the other relay of the pair of relays to which it belongs.

Preferably, this calculation is performed after detection of a fault in the second zone $Z_2$ so as to determine whether the other relay has detected this fault in the first zone $Z_1$.

The protective device is thus capable, by monitoring the variation in the measured impedance of the line, of detecting the opening of one or more circuit breakers of one of the relays, which brings about a variation in the measured impedance of the line, in such a way as to cause, in response, the opening of one or more circuit breakers associated with the other relay and of thus isolating the defective line from the network of supply lines.

To carry out the detection of the opening of a circuit breaker, several criteria may be used.

Firstly, it is possible to calculate the relative difference between the measured impedance of the line before opening and after opening, by establishing the following ratio R1:

$$R_1 = \frac{|Z_{Bclos} - Z_{Bopen}|}{|Z_{Bclos}|} \qquad (1)$$

in which:

$Z_{Bclos}$ represents the value of the impedance measured by one of the relays, for a defective phase of the line, when the circuit breaker associated with the other relay is closed and $Z_{Bopen}$ the value of the impedance measured by one of the relays, for a defective phase of the line, when the circuit breaker associated with the other relay is open.

By comparing the calculated ratio R1 with a predetermined threshold value, fixed for example at 10% or 20% of the value of the impedance of $Z_{Bclos}$, it is possible to detect the opening of the circuit breaker.

Likewise, it is possible to detect the opening of a relay by calculating the following ratio R2:

$$R_2 = \frac{|Z_{Bclos}| - |Z_{Bopen}|}{|Z_{Bclos}|} \qquad (2)$$

in which:

$|Z_{Bclos}|$ represents the absolute value of the value of the impedance measured by one of the relays, for a defective phase of the line, when the circuit breaker of the other relay is closed; and $|Z_{Bopen}|$ represents the absolute value of the impedance measured by one of the relays, for a defective phase of the line, when the circuit breaker of the other relay is open, and by comparing this ratio R2 with a threshold value, fixed for example at an increase of 10% or 20% of the value of the impedance $Z_{Bclos}$.

It is also possible, as a variant, to monitor the evolution over time of the value Z of the impedance of the line measured by the relays and to compare this value with a set of threshold values.

Figure 3:
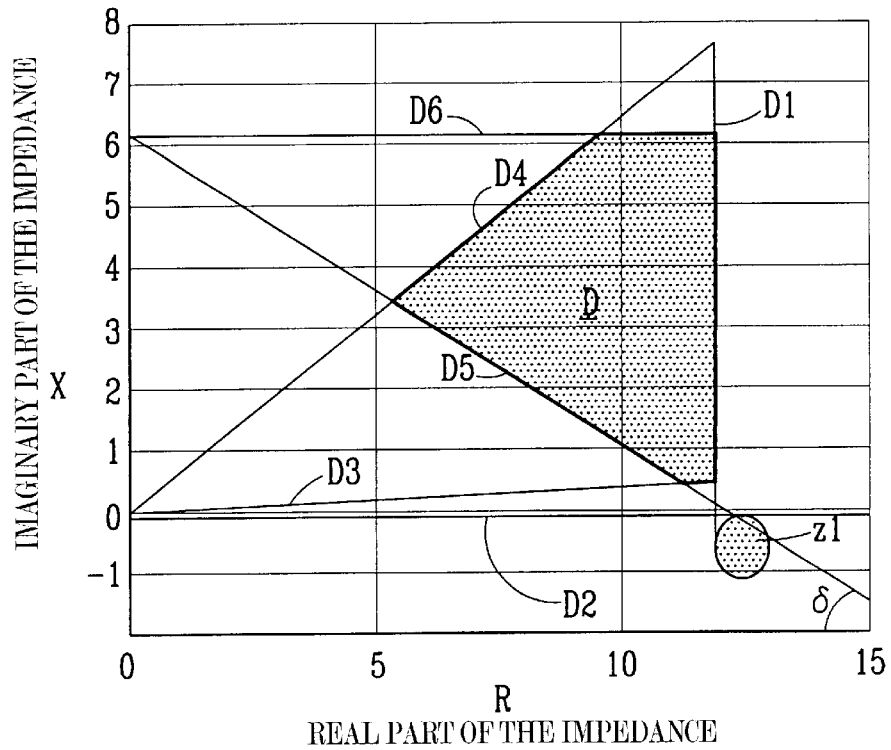
FIG. 3 is a complex representation illustrating the zone for detecting, by one of the relays, the opening of the other relay, for a positive transit of power.
Figure 4:
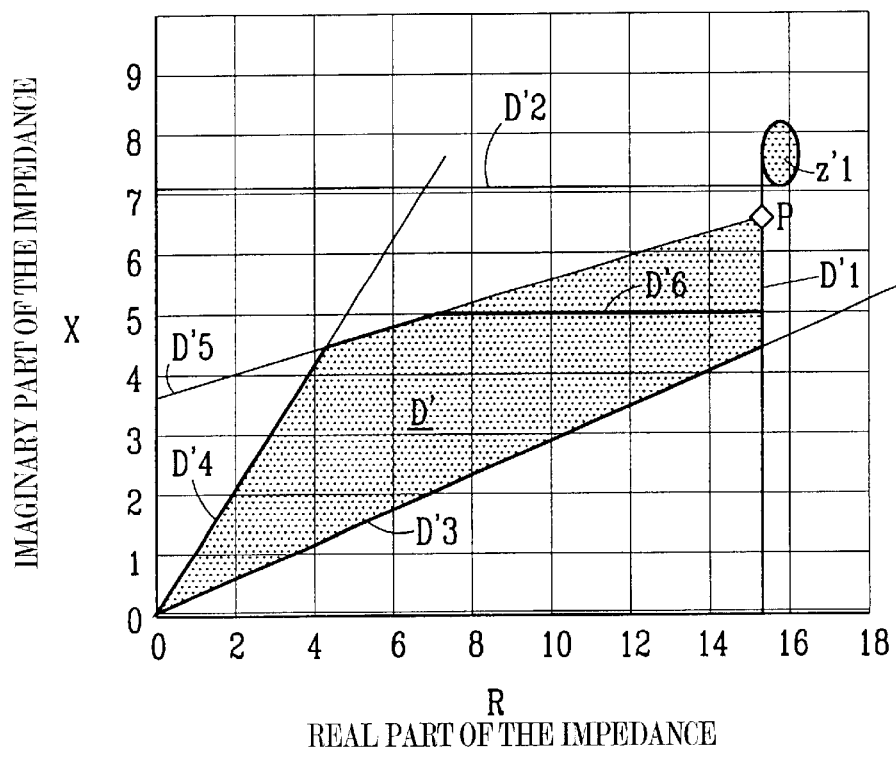
FIG. 4 is a complex representation illustrating the zone for detecting, in respect of one of the relays, the opening of the other relay, for a negative transit of power.

As may be seen in FIGS. 3 and 4, as a complex representation, the threshold values constitute a detection zone.

In these figures, the abscissa corresponds to the real part R of the impedances and the ordinate corresponds to the imaginary part X of the impedances.

Referring firstly to FIG. 3, which corresponds to a positive transit of power before the occurrence of a fault, it may be seen that, after a fault occurs, the value of the measured impedance of the line lies in a zone $z_1$. This zone $z_1$ is computed on the basis of the value of the impedance of the line measured after occurrence of the fault and before opening of the distant circuit breaker, and by drawing a circle of diameter equal for example to 0.5 Ω so as to ignore variations in impedance of less than 0.5 Ω for example.

As may be seen in FIG. 3, the detection zone is delimited by straight lines D1 to D6 obtained from simulations of a network. The straight lines D1 and D2 correspond respectively to minimum and maximum values of real and imaginary parts of the measured impedance of the line when the distant circuit breaker is closed, after the occurrence of the fault, below and above which, respectively, an opening of one or more distant circuit breakers is deemed possibly to have transpired.

On the basis of these straight lines D1 and D2, the detection zone D, hatched in FIG. 3, is delimited by two straight lines D3 and D4 corresponding to maximum and minimum arguments of the variation in the impedance measured when the distant circuit breaker is open, above and below which an opening of one or more circuit breakers may possibly have transpired, and by a straight line D5 corresponding to a variation in the impedance measured as a function of the resistance of the fault.

As may be seen in FIG. 3, the straight line D1 is drawn on the basis of the real part of the value of the impedance measured after the occurrence of the fault, displaced for example by −0.5 Ω, in so far as the real part of the difference between $Z_{Bclos}$ and $Z_{Bopen}$ is always greater than its imaginary part and is drawn at an angle of 90°.

The straight line D2 is constructed on the basis of the imaginary part of the impedance measured after the occurrence of the fault, displaced for example by +0.5 Ω and drawn at an angle of 0°.

The straight lines D3 and D4 are computed on the basis of simulations indicating that the argument of the impedance measured after opening of the distant relay is for example between approximately 5° and 35°. Finally, the straight line D5 is drawn in such a way as to avoid any possibility of inadvertent triggering of the relay. This straight line is computed by establishing the coefficient of variation of the impedance $Z_{Bclos}$ as a function of the resistance of a fault, this variation being substantially linear for a fault resistance varying between 1 Ω and 10 Ω, and by determining the angle δ at which the straight line thus established cuts the axis R of the reals.

Finally, in so far as the straight line D1 and the straight line D4 might not have any point in common, a sixth straight line D6 is computed on the basis of the point at which the straight line D5 cuts the axis X of the imaginary parts and drawn at a zero angle.

It is thus possible, by monitoring the variation in the measured impedance to detect the opening of the distant relay, by detecting whether this measured impedance reaches the zone D delimited by these straight lines D1 to D6.

With reference to FIG. 4, a zone D' for detecting the opening of the distant relay, delimited by the straight lines D'1 to D'6, is likewise defined for a negative transit of power.

As in the previous case described with reference to FIG. 3, for a negative transit, the detection zone D' is computed on the basis of a zone z'1 defined on the basis of the value of the impedance measured after the occurrence of the fault, and surrounded by a circle of radius equal for example to 0.5 Ω so as to ignore impedance variations of less than 0.5 ohms.

The straight lines D'1 and D'2 are drawn respectively on the basis of the real part and of the imaginary part of the value of the impedance measured after the occurrence of the fault when the distant circuit breaker is closed.

Likewise, as in the previous case, the straight lines D'3 and D'4 are computed on the basis of electrical engineering calculations establishing that the argument of the variation in the measured impedance, after opening of the distant relay, is for example between −10° and +20°.

The straight line D'5 is computed in such a way as to avoid any inadvertent triggering.

To do this, one calculates the value of the impedance obtained in the presence of a fault of zero resistance at the same spot, the point P thus obtained is sited, and one determines the variation in the measured impedance of the line as a function of the resistance of a fault present thereon and of non-zero resistance, for example for resistance values of between 1 and 5 Ω, so as to define the slope of the straight line D'5.

One thus defines a detection zone D' which makes it possible to detect the opening of the distant relay when the value of the impedance lies inside this zone D'.

It should be noted that, in the foregoing, the threshold values allowing the detection of the opening of the distant relay are chosen in such a way as to make a distinction between a variation in the measured impedance due to a variation in the resistance of the fault and a variation in the measured impedance due to an opening of the distant relay.

It is appreciated that the invention just described, which is capable of detecting the opening of a distant relay, on the basis of the value of electrical quantities representative of the operation of the monitored supply network, makes it possible considerably to reduce the triggering time of the protective relays in the presence of a detected fault and, thus, to obtain similar operation to the distance protection devices equipped with telecommunication means, whilst preserving good selectivity at lesser cost.

What is claimed is:

1. Device for protecting a line of a network of electricity supply lines each having an impedance, said device comprising at least two protective relays each arranged at one end of the line, each relay having means for detecting faults and being associated with a circuit breaker, each circuit breaker being adapted to disconnect the line from said network of lines when a fault is detected on this line, each protective relay being adapted to monitor a first zone of the network and at least a second zone of the network, said first zone extending over a portion of the line and corresponding to a zone of certain detection of a fault on the line, said second zone of the network being juxtaposed with the first zone, said second zone overlapping a portion of an adjacent supply line and corresponding to a zone of uncertain detection of a fault on said line, said second zone of one of the two protective relays encompassing a portion of the line in which the other of the protective relays is situated, at least one relay of the two protective relays comprising means for detecting the opening of the circuit breaker associated with the other of said two protective relays, said detection means being responsive to a detection by said other relay of a fault in the first zone of said other relay so as to cause opening of the circuit breaker associated with said at least one relay, said means, for detecting the opening of said circuit breaker, comprising means for calculating a characteristic, representative of a variation of a measurement value of the impedance of the line, and means for comparing said characteristic with at least one threshold value for triggering the opening of the circuit breaker.

2. Device according to claim 1, wherein said calculating means consists of means for calculating the following ratio $R_1$:

$$R_1 = \frac{|Z_{Bclos} - Z_{Bopen}|}{|Z_{Bclos}|}$$

in which:

$Z_{Bclos}$ represents the value of the impedance of the line measured by one of the relays, for a defective phase of the line, when the circuit breaker of the other relay is closed, and $Z_{Bopen}$ represents the value of the impedance of the line measured by one of the relays, for a defective phase of the line, when the circuit breaker of the other relay is open.

3. Device according to claim 1, characterized in that said calculating means consists of means for calculating the following ratio $R_2$:

$$R_2 = \frac{|Z_{Bclos}| - |Z_{Bopen}|}{|Z_{Bclos}|}$$

in which:

$|Z_{Bclos}|$ represents the absolute value of the value of the impedance measured by one of the relays, for a defective phase of the line, when the circuit breaker of the other relay is closed; and $|Z_{Bopen}|$ represents the absolute value of the impedance measured by one of the relays, for a defective phase of the line, when the circuit breaker of the other relay is open.

4. Device according to claim 1, characterized in that said calculating means consists of means for calculating the impedance of the line.

5. Process for protecting a line of a network of electricity supply lines, the line being equipped, at each end, with one of two protective relays, each relay comprising means for detecting faults and a circuit breaker adapted to disconnect the line from the network of lines in the presence of a fault detected on said line, the process comprising the steps consisting of, for at least one of the relays:

monitoring a first network zone, extending over a portion of the line corresponding to a zone of certain detection of a fault on the line, and at least one second network zone, juxtaposed with the first zone and overlapping a portion of an adjacent supply line, and detecting a fault in the zones, the second zone encompassing a portion of the line in which the other relay is situated and corresponding to a zone of uncertain detection of a fault on said line; and opening the circuit breaker of the relay should a fault be detected in the first zone, wherein, in the course of the step of monitoring the first and second zones of the network, a value of a characteristic representative of a variation of a measurement value of the impedance is calculated, the calculated value is compared with at least one threshold value for detecting opening of the circuit breaker of the other relay, and the opening of the circuit breaker of the relay is triggered should the threshold value or values be exceeded.

6. Process according to claim 5, characterized in that said characteristic consists of one of the following ratios $R_1$ and $R_2$:

$$R_1 = \frac{|Z_{Bclos} - Z_{Bopen}|}{|Z_{Bclos}|}$$

$$R_2 = \frac{|Z_{Bclos}| - |Z_{Bopen}|}{|Z_{Bclos}|}$$

in which:

$Z_{Bclos}$ and $|Z_{Bclos}|$ respectively denote the value and the absolute value of the impedance measured by one of the relays, for a defective phase of the line, when the circuit breaker of the other relay is closed; and $Z_{Bopen}$ and $|Z_{Bopen}|$ respectively denote the value and the absolute value of the impedance measured by one of the relays, for a defective phase of the line, when the circuit breaker of the other relay is open.

7. Process according to claim 5, characterized in that, with said characteristic consisting of the impedance measured after the occurrence of the fault, the threshold value constitutes, in a complex representation, a zone of detection of the opening of the circuit breaker of the other relay, which zone is delimited, for a positive transit of power, both by straight lines (D1, D2) respectively corresponding to minimum and maximum values, of the real and imaginary parts of the impedance measured after the occurrence of the fault, and to maximum and minimum arguments of the variation in the impedance measured when a distant circuit breaker is open, and also by a straight line corresponding to a variation in the impedance measured as a function of the resistance of the fault.

8. Process according to claim 5, characterized in that, with said characteristic consisting of the measured impedance, the threshold value constitutes, in a complex representation, a zone of detection of the opening of the circuit breaker of the other relay, which zone is delimited, for a negative transfer of power, both by straight lines corresponding to minimum values, of the real and imaginary parts of the impedance measured after the occurrence of the fault, and to minimum and maximum arguments of the variation in the measured impedance of the line when a distant circuit breaker is open, and also by a straight line computed on a basis of the value of the impedance in the presence of a fault of zero resistance at a same spot and of the variation in the impedance measured as a function of the resistance of a fault present on the line and of non-zero resistance.

* * * * *